Feb. 1, 1927.

W. S. MYERS

DIAMOND GAUGE

Filed May 16, 1925

1,616,060

Inventor
Walter S. Myers
By his Attorney

Patented Feb. 1, 1927.

1,616,060

UNITED STATES PATENT OFFICE.

WALTER S. MYERS, OF PORTLAND, OREGON.

DIAMOND GAUGE.

Application filed May 16, 1925. Serial No. 30,773.

My improvement relates to a new and improved diamond gauge adapted to measure and to indicate the result of the measurement upon a graduated dial by the gauging of the width and depth of the jewel and to indicate the measurements thus ascertained upon a graduated scale disposed upon the upper, outer, face of the gauge.

Heretofore it has been the custom to measure the width and depth of the jewel and to take the indication as made and read the indicated size by reference to a table prepared for that purpose, but in my new and improved diamond gauge, I make the measurement by the application of the device to the face of the jewel and read directly upon the instrument itself, the indicated size of the jewel. The graduated face of the gauge being graduated to indicate small fractional parts, of the primary size as one-fourth carat, one-half carat, three-fourths carat, one carat, one one-fourth carats, one one-half carats, one three-fourths carats, and additional indications. There being sub-divisions of the main primary divisions.

The necessity for an instrument of this kind is brought about because, in many transactions, it becomes necessary to know the size of the jewel by measuring the same, without its removal from its mounting.

A further object of my invention consists in a new and novel application of spring measure, adapted to maintain the contacting points of the instrument in contact with the jewel being measured. When the contacting points are released from the jewel, and the pointer returned to the initial position by the return of the closure plate the engaging points will automatically return to closed and zero position.

A further object of my invention consists in the concealment of the cam actuator, located within the instrument for indicating the size of the jewel being measured, without the exposure of the actuator to the necessary disintegrating elements of dust and other injurious conditions that would attack the same if it were exposed.

A further object of my invention consists in the making of the same of few parts, simple of construction, easily made and read and one that will not easily get out of order.

With these and incidental objects in view, the invention consists in certain novel features of construction and combination of parts, the essential elements of which are set forth in the appended claims, and to a preferred form of embodiment of which is hereinafter shown with reference to the drawings which accompany and form a part of this specification.

In the drawings:—

Like reference characters refer to like parts throughout the several views.

Figure 1:
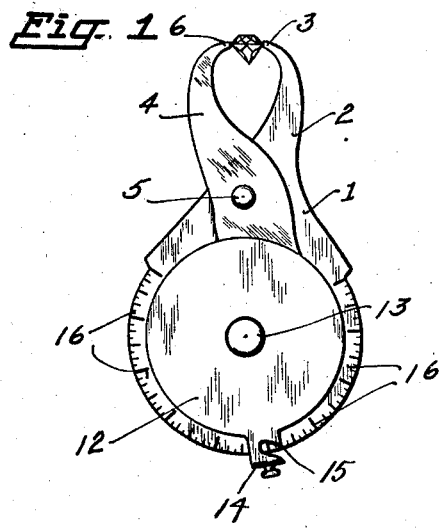
Fig. 1 is a plan view of my device shown in contact with the face of a jewel.
Figure 2:
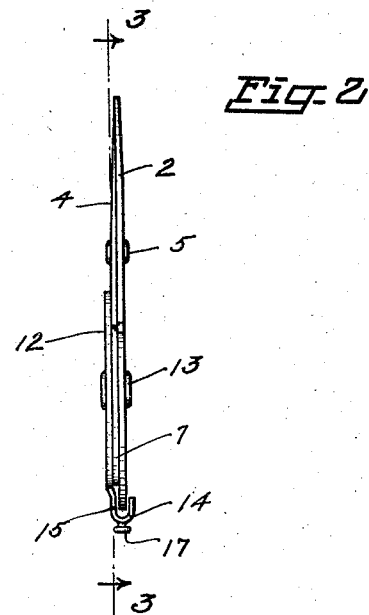
Fig. 2 is a side elevation of the mechanism shown in Fig. 1.
Figure 3:
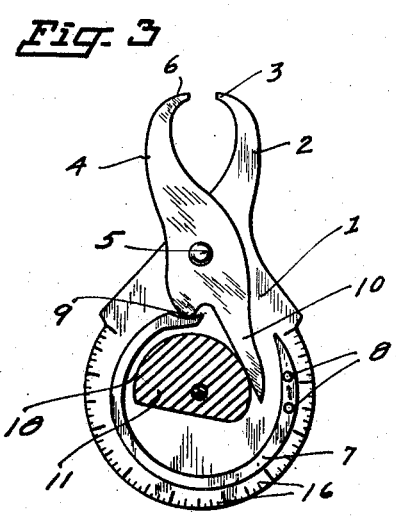
Fig. 3 is a partial plan, sectional view, taken on line 3—3 of Fig. 2, looking in the direction indicated, the same in reality is a plan view of the assembled device, with the closure plate removed and made to illustrate primarily the spring return, and the cam actuator.
Figure 4:
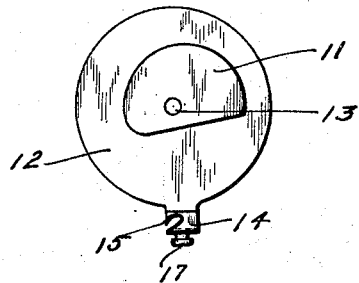
Fig. 4 is an inverted plan view of the closure plate, illustrating the cam actuator secured thereto.

1 is the body portion of the device, terminating in a fixed arm 2, engaging with the jewel to be measured at terminal point 3. A movable arm 4, is disposed upon the fixed arm and pivoted about pin 5, and so arranged that the engaging points 6 and 3 are adapted to engagement with each other, when the device is closed; also disposed upon the face of the main body portion 1, is a spring 7, secured to the main body portion by suitable fastening means, as rivets 8; this main body member is arcuate in shape and adapted to engage with the movable arm, as shown in Fig. 3 at 9. The movable arm also has a wing portion 10, disposed thereon and adapted to engagement with a cam actuator 11. The cam 11 which is secured to the closure 12, has an outer diameter equal, or approximating the diameter of the spring 7, so that a neat compact instrument is thus created. The actuator cam 11, the spring 7 and the wing 10 of the movable arm 4, are approximately equal in thickness. The closure 12, mounting the actuator cam 11, is journaled about a fixed hub 13, which is adapted to maintain a close working relationship between the closure and the other movable mechanism composing the diamond gauge. Disposed upon the outer periphery of the closure 12, is a suitable arm 14, having a pointer 15, adapted to register with the graduations 16, disposed upon the main body portion of the gauge, more particularly shown in Fig. 1. An arm 17 is adapted to the moving of the closure member. The maintaining of the main body portion of the diamond gauge in fixed position and the rotation of the closure causes the outer periphery of the actuator cam 11, as shown at 18, to engage with the wing portion 10 of the movable arm 4, thereby tensioning the spring 7, and creating an opening between the engaging points 3 and 6 of the engaging arms, which will permit of the engagement of the points 6 and 3 with the jewel to be calipered. When the same engage with the jewel, the pointer 15 registers with the graduations upon the main body portion, and indicates the precise measurement of the jewel being measured; and indicates also the size of the same upon the graduations of the main body portion. The arms remain in this position so long as they engage with the jewel, but when the same is disengaged therefrom, the spring will return the arms to the normal closed position upon the same being released. The closure 12, working in close relationship with the spring 7, tends to eliminate dust particles and other foreign substance from getting within the closure, wherein the actuator cam, and the wing portion of the movable arm, contact with each other, as it is apparent that the cam action upon the movable arm is of fine adjustment and will indicate in a precise manner the measurements calipered upon the graduations of the fixed body portion of the diamond gauge.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. A diamond gauge comprising a graduated body portion terminating in an engaging point, an engaging arm secured to the main body portion and in pivotal relationship therewith terminating in an engaging point adapted to contact with the engaging point of the body portion, a wing disposed upon the pivoted arm and spring means adapted to maintain the engaging points in normally closed position, a closure plate disposed upon the body portion and journaled centrally thereof, and a cam actuator disposed on the under side of the closure and engaging the wing portion of the pivoted arm, and means to register on the graduated body the opening created between the engaging points.

2. A diamond gauge comprising a graduated body portion terminating in an engaging point, an arm disposed upon the body portion and in hinged relations therewith, terminating in an engaging point adapted to contact with the engaging point of the main body portion, and having a wing portion disposed opposite the engaging point, spring means, secured to the main body portion, adapted to normally maintain the contacting points in closed relationship, a closure rotatably mounted on the body portion, a cam actuator disposed on said closure and engaging with said wing portion, and adapted to create an opening between the engaging points, and a pointer disposed on said closure to indicate on the graduated body portion the opening thus created.

3. A diamond gauge comprising a graduated main body portion adapted to indicate the relative size of a jewel, an engaging point upon the body portion, an arm pivoted on the body portion terminating in an engaging point adapted to contact with the engaging point of the main body portion, a wing portion formed at the opposite end thereof, a spring mounted upon the main body portion and adapted to maintain the pivoted arm normally in contact with the engaging point of the main body portion, a closure, carrying a cam actuator to engage with said wing portion journaled centrally of the main body portion and adapted to move the engaging points apart, and a pointer on said closure to indicate the amount of movement.

4. A diamond gauge comprising a body portion terminating in an engaging point, there being a graduated scale formed on the body portion; an arm pivotally mounted to said body portion; an engaging point formed at one end of said arm to contact with the engaging point of the body portion, a wing portion disposed on said pivoted arm, a closure disk rotatably mounted on said body portion, a cam actuator disposed on said closure disk and engaging with said wing portion to actuate said pivoted arm; and a spring mounted on the body portion and about the cam actuator, and pressing on said pivoted arm, to maintain the engaging point thereof in contact with the engaging point of the body portion.

5. A diamond gauge comprising a body portion terminating in an engaging point, there being a graduated scale formed on said body portion, a movable arm pivoted to the body portion and having, an engaging point normally engaging with the engaging point of the body portion, a wing portion formed on the movable arm, a disk closure rotatably mounted on the body portion and within the graduated scale, a cam actuator mounted on the disk closure and between it and the body portion, and engaging with the wing portion of the body portion; a spring disposed between the disk closure and the body portion, one end of which is secured to the body portion and the other contacting with the movable arm; an arm disposed upon the outer periphery of the disk closure; and a pointer disposed on said arm to register with the graduations on the body portion.

6. A diamond gauge comprising a body portion terminating in an engaging point, an arm pivotally mounted thereto, an engaging point formed on the pivotal arm and adapted to contact with the engaging point on the body portion, a spring mounted on the body portion and normally maintaining said engaging points in contact with each other; a rotatable closure mounted on the body portion; and means associated with said rotatable closure adapted to separate said contacting and engaging points upon rotation thereof.

WALTER S. MYERS.